United States Patent [19]

James, Sr.

[11] Patent Number: 4,932,288
[45] Date of Patent: Jun. 12, 1990

[54] APPARATUS FOR MANIPULATING A TOOL

[75] Inventor: James R. James, Sr., Clarksville, Ind.

[73] Assignee: Accuratio Systems, Inc., Jeffersonville, Ind.

[21] Appl. No.: 295,491

[22] Filed: Jan. 11, 1989

[51] Int. Cl.$^5$ ............................ F16C 3/28; B23C 5/00
[52] U.S. Cl. ...................... 74/600; 33/27.09;
    219/121.67; 219/121.78; 409/142; 409/200
[58] Field of Search .................. 74/600, 601;
    219/121.67, 121.79, 121.78; 408/147; 409/122,
    142, 190, 191, 200; 33/27.09

[56] References Cited

U.S. PATENT DOCUMENTS

| | | | |
|---|---|---|---|
| 975,437 | 11/1910 | Kunkel | 74/600 X |
| 2,590,420 | 3/1952 | Lagher | 74/600 X |
| 2,926,548 | 3/1960 | D'Andrea | 74/600 |
| 2,960,013 | 11/1960 | Novkov | 74/600 X |

Primary Examiner—Allan D. Herrmann
Attorney, Agent, or Firm—Jon C. Winger

[57] ABSTRACT

An apparatus for manipulating a tool along a spiral path into a circular or orbital path includes a first shaft and a second shaft in end-to-end relationship. The apparatus includes a slide device interconnecting the adjacent ends of the first and second shafts for allowing the second shaft to move tranversely of and in a generally radial direction away from the first shaft as the first shaft rotates about its own longitudinal axis. The tool to be manipulated is attached to the distal end of the second shaft. As the first shaft rotates about its own longitudinal axis, the second shaft moves radially away from the first shaft so that the second shaft, and tool attached thereto, follow an initial spiral path leading into an orbital path centered on the longitudinal axis of the first shaft.

11 Claims, 3 Drawing Sheets

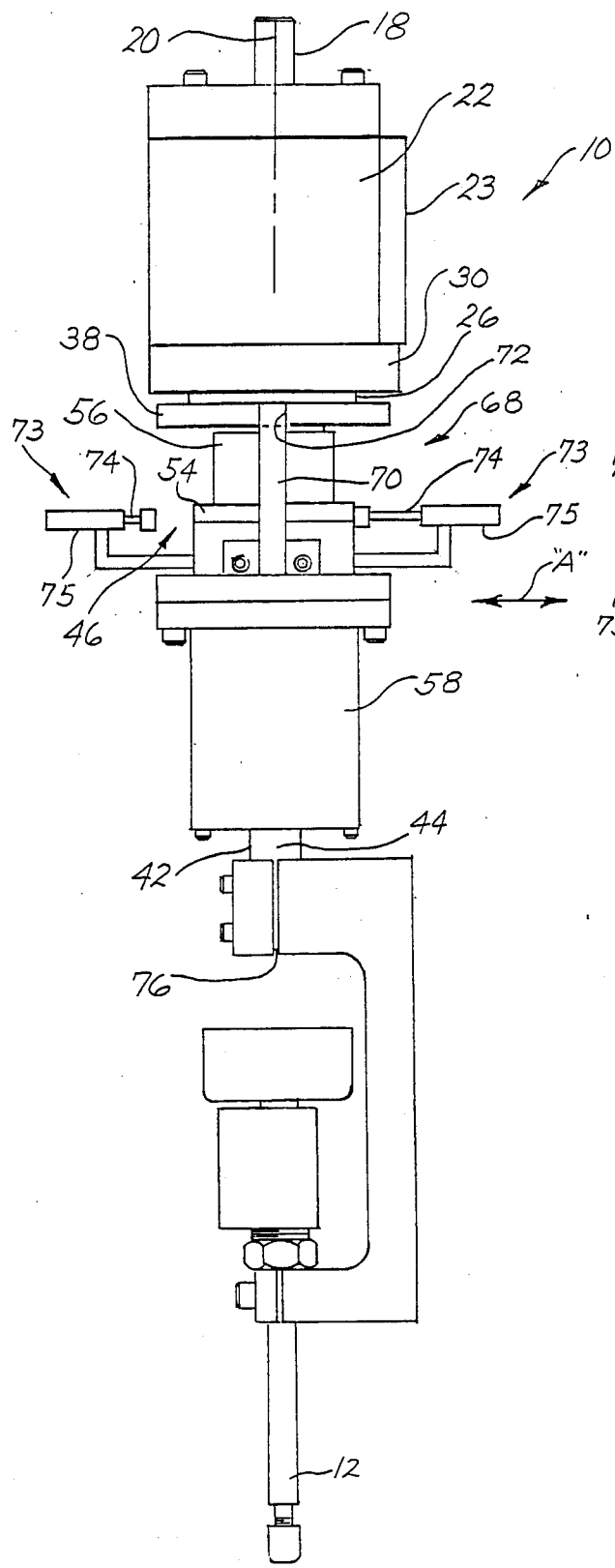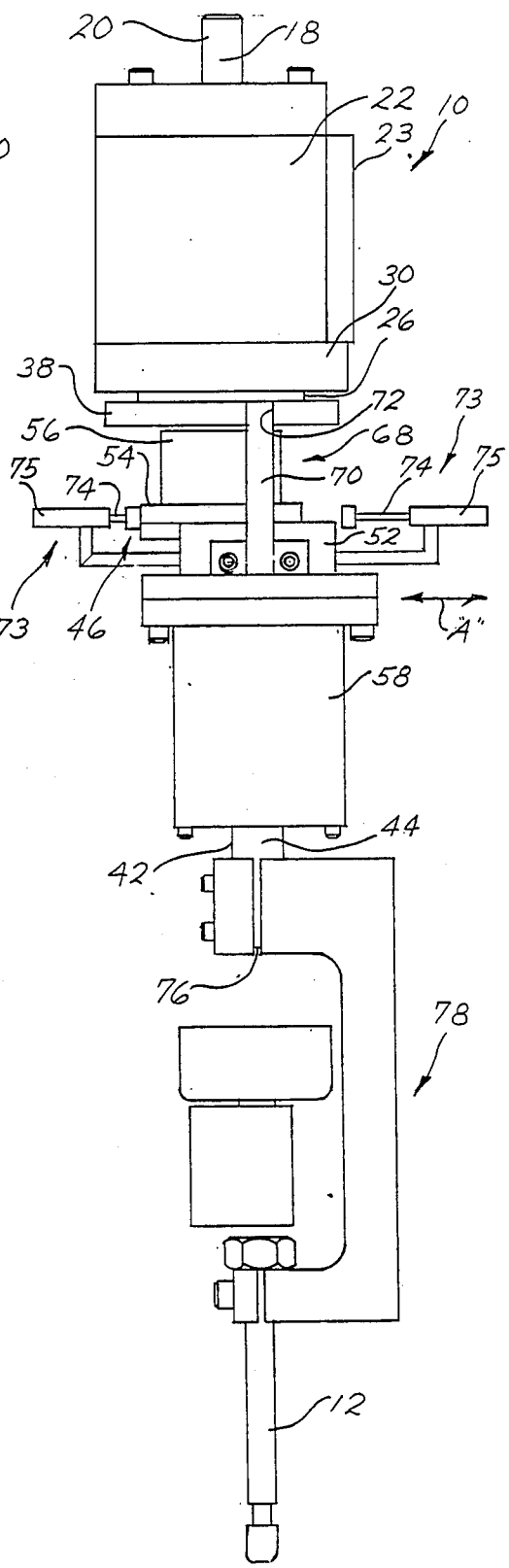

APPARATUS FOR MANIPULATING A TOOL

BACKGROUND OF THE INVENTION

The present invention relates to apparatus for manipulating or advancing a tool, and more particularly to an apparatus for advancing a tool along a spiral path.

The present invention is particularly useful in manipulating and advancing a cutting tool in order to cut circular holes in a workpiece.

A problem encountered in cutting holes in a workpiece is in making the margin of the hole smooth around the entire circumference of the hole. The problem is how to begin cutting the hole without creating a discontinuity at the margin of the hole to accommodate the cutting tool itself, to begin the cutting operation. When using a mechanical cutting tool, such as a saw, a hole must be made in the workpiece to receive the saw therethrough. When using a cutting tool, such as a laser beam or high energy water jet, a hole will be initially made in the workpiece by the laser beam or water jet before the actual cutting operation begins. If this starting hole is at the margin of the final cut, it can create a blemish or discontinuity at the margin of the hole to be cut.

A solution is to begin the cutting operation inside the peripheral margin of the hole to be cut and then to advance the cutting tool to a location which will be the peripheral margin of the hole to be cut in the workpiece.

The present invention is also particularly useful in manipulating and advancing a cutting tool in order to cut a finished disc from a material stock.

The problem encountered in cutting a disc from a material stock is similar to that encountered in cutting a hole in a workpiece, that is, making the periphery of the disc smooth around the entire circumference of the disc. The problem is how to begin cutting the disc without creating a discontinuity at the periphery of the disc to accommodate the cutting tool itself.

A solution is to begin the cutting operation outside the peripheral margin of the disc to be cut out of the material stock.

SUMMARY OF THE INVENTION

The present invention recognizes these problems and provides an apparatus for advancing a tool from an initial or starting location to a final predetermined location.

The present invention provides an apparatus for advancing a tool along a spiral path from an initial position to a predetermined circular path.

More particularly, the present invention provides an apparatus for advancing a tool along a spiral path to a circular path comprising a first shaft mounted for rotation about its longitudinal axis; a brake disc connected to the first shaft for rotation therewith; a brake rotor adjacent to and in friction contact with the brake disc, and mounted for rotation about the longitudinal axis of the first shaft; a second shaft disposed with its longitudinal axis parallel to the longitudinal axis of the first shaft and located in end-to end relationship with the first shaft, and spaced longitudinally from the first shaft; slide means associated with the top end of the second shaft which end is adjacent to the bottom end of the first shaft to allow the second shaft to move transversely of its own longitudinal axis and also to the longitudinal axis of the first shaft and also to allow the second shaft to revolve about the longitudinal axis of the first shaft; and means for drivingly interconnecting the brake rotor and the slide means for moving the slide means in a direction transverse to the longitudinal axis of the first shaft as the first shaft rotates about its longitudinal axis.

BRIEF DESCRIPTION OF THE DRAWINGS

A better understanding of the invention will be had upon reference to the following description in conjunction with the accompanying drawings wherein like numerals are used for like parts and in which:

FIG. 2 is a side view as seen in the direction of arrows 2—2 in FIG. 1 in a first position;

FIG. 3 is a side view similar to that of FIG. 2 but showing the apparatus in a second position;

DETAILED DESCRIPTION OF THE PREFERRED EMBODIMENT

Figure 1:
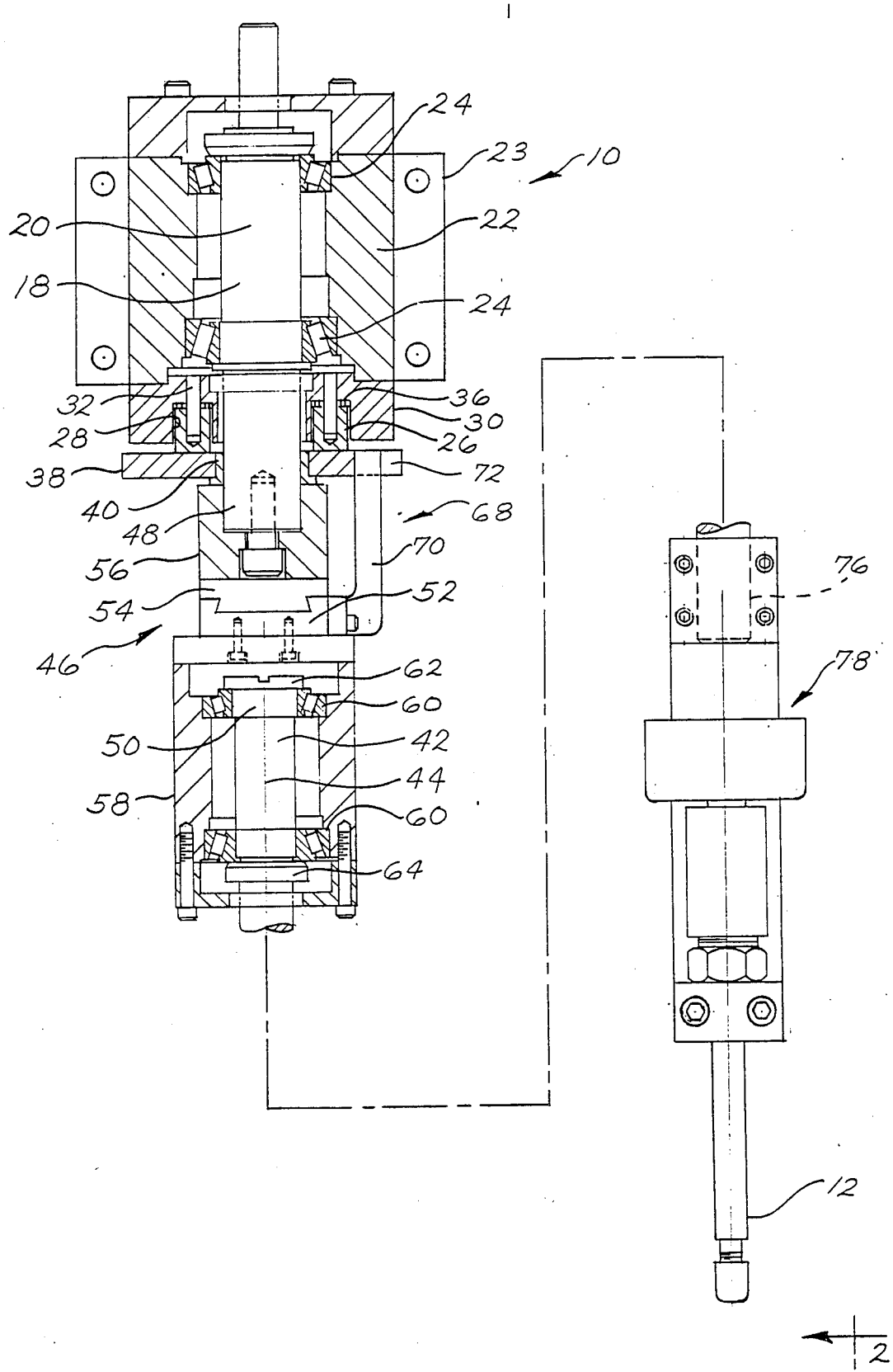
FIG. 1 is a cross-sectional front view of the preferred embodiment of the present invention.
Figure 4:
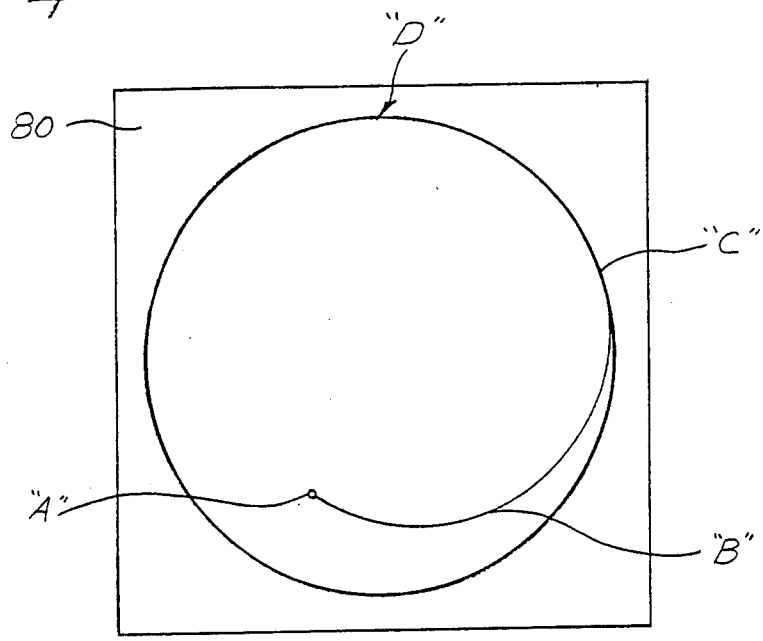
FIG. 4 is an illustration of the movement of a tool attached to the apparatus of FIGS. 1-3 as the apparatus moves from the initial position of FIG. 2 to the final position of FIG. 3 for cutting a hole in a workpiece; and, FIG. 5 is an illustration of the movement of a tool attached to the apparatus of FIGS. 1-3 as the apparatus moves from the position shown in FIG. 3 to the position shown in FIG. 2 for cutting a disc from a material stock.

With reference to FIGS. 1-3, there is shown an apparatus, generally denoted as the numeral 10, for advancing a tool 12 along a spiral path "B" to a circular path "D" (see FIG. 4).

With reference to FIGS. 1, 2 and 3, the apparatus 10 includes a first or driven shaft 18 mounted for rotation about its longitudinal axis 20. As shown, the first shaft 18 is located with a stationary housing 22. The housing 22 can include mounting flanges 23 for mounting the housing 22, and thereby mounting the apparatus 10, to a machine frame (not shown). The first shaft 18 can be mounted within the housing 22 by appropriate bearings 24 for rotation about its longitudinal axis. The first shaft 18 can be driven by a motor (not shown) drivingly connected to the top end of the first shaft 18 which protrudes from the housing 22.

The apparatus 10 also includes a brake disc 26 connected to the stationary housing 22. As shown best in FIG. 1, the brake disc 26 is annular in shape and is concentrically located with the first shaft 18. The brake disc 26 is received in an annular pocket 28 formed in a brake disc case 30. The brake disc case 30 is toroidal in shape and is concentrically located with the first shaft 18. The brake disc case 30 is connected to the stationary housing 22 by virtually any convenient means; for example, by bolts. The brake disc 26 is secured with the pocket 28 of the brake disc case 30 against rotation relative to the brake disc case 30. This can be accomplished by, for example, brake disc securing pins 32 affixed to the brake disc case 30 at the blind end of the annual pocket 28 extending therefrom into the pocket 28 and received in pin receiving holes formed in the brake disc 26. In addition, biasing means 36, such as a wave spring, is located within the annular brake disc pocket 28 to bias the brake disc 26 in a direction of the opening of the brake disc pocket 28 along the longitudinal axis of the first shaft 18.

A brake rotor 38 is located adjacent to, and in frictional contact with the brake disc 26. The brake rotor 38 is mounted for rotation about the longitudinal axis 20 of the first shaft 18 by means of, for example, a bushing 40. As best shown in FIG. 1, the brake rotor 38 is annular in shape and is concentrically located with the first shaft 18 in face-to-face contact with the brake disc 26. As shown, the annular brake rotor 38 is coaxially mounted on the first shaft 18 on an intervening bearing 40 so that the brake rotor 38 can rotate about the longitudinal axis 20 of the first shaft 18 relative to the first shaft 18.

A second shaft 42 is disposed with its longitudinal axis 44 parallel to the longitudinal axis 20 of the first shaft 18 and in end-to-end relationship with the first shaft 18 with the adjacent ends of the first shaft 18 and second shaft 42 spaced apart from each other in the longitudinal direction of the first and second shafts 28, 42. For the sake of clarity of description, the adjacent or proximal ends of the first and second shafts will hereinafter be described as the bottom end 48 of the first shaft 18 and top end 50 of the second shaft 42.

Slide means, generally denoted as the numeral 46, interconnect the first shaft 18 to the second shaft 42 to provide for movement of the second shaft 42 relative to the first shaft 18 transversely to the longitudinal axis 20 of the first shaft 18 and, therefore, also transversely to the longitudinal axis 44 of the second 42 itself, and also to provide for the rotation of the second shaft 42 with the first shaft 18 in an orbit about the longitudinal axis 20 of the first shaft 18. Toward this objective, the slide means 46 interconnects the bottom end 48 of the first shaft 18 to the top end 50 of the second shaft 42. The slide means 46 is shown in FIGS. 1, 2 and 3, as including a slide member 52 located at the top end 50 of the second shaft 42 and a slide receiving member 54 located at the bottom end 48 of the first shaft 18 receiving the slide member 52. The slide receiving member 54 is attached to the first shaft 18 for rotation therewith about the longitudinal axis of the first shaft 18 as the shaft 18 rotates, and allows the slide member 52 to move relative to the slide receiving member 54 in only a linear direction transversely, or radially, to the longitudinal axis 20 of the first shaft 28 and, therefore, also transversely to the longitudinal axis 44 of the second shaft 42, as indicated by the double head arrow A in FIGS. 2 and 3. The slide member 52, therefore, rotates with the slide receiving member 54 about the longitudinal axis 20 of the first shaft 18 as the first shaft 18 rotates. The slide receiving member 54 is connected to the bottom end 48 of the first shaft 18 by a bracket 56. The bracket 56 is shown in FIG. 1 as being shaped like a cap which receives the bottom end 48 of the first shaft 18 beneath the brake disc 26. The bracket 56 is secured to the first shaft 18 for rotation therewith by means of, for example, a bolt which extends through an appropriate hole in the bracket 56 and extends into an appropriately threaded bore in the bottom end 48 of the first shaft 18. The slide member 52 is connected to the top end 50 of the second shaft 42 by means of a bracket 58. The bracket 58 is shown in FIG. 1 as being a sleeve which coaxially receives the top end portion 50 of the second shaft 42. The sleeve bracket 58 is mounted to the second shaft 42 so that the second shaft 42 will remain stationary about its own longitudinal axis, that is it will not be rotated about its own longitudinal axis 44 as it moves in an orbit about the longitudinal axis 20 of the first shaft 18. This is accomplished by mounting the sleeve bracket 58 on the second shaft 42 by means of roller bearings 60. The second shaft 42 includes an upper retainer ring 62 and a lower retainer ring 64 caging the roller bearings 60 therebetween and, thus, holding the second shaft 42 in the sleeve bracket 58 against movement of the second shaft 42 longitudinally of the second shaft 42.

Slide member moving means, generally denoted as the numeral 68, interconnects the brake rotor 38 to the slide member 52 to cause the slide member 52 to move transversely of the longitudinal axis 20 as the first shaft 18 and slide means 46 rotate about the longitudinal axis 20 relative to the stationary brake rotor 38. The slide moving means 68 also, thereby causes the second shaft 42 to move transversely away from the first shaft 18 radially of the first shaft 18 as the second shaft 42 rotates in an orbit around the longitudinal axis 20 of the first shaft 18 as the first shaft 18 rotates about its longitudinal axis 20. The slide member moving means 68 comprises an arm 70 attached at its bottom or proximal end to one lateral side of the slide member 52. The arm 70 extends upwardly from the slide member 52 generally parallel to the longitudinal axis 20 of the first shaft 18 and is spaced from the first shaft 18 by a distance less than the radius of the brake rotor 38. The arm 70 extends to the brake rotor 38 with the distal end of the arm 70 received in a radial slot 72 formed in the brake rotor 38.

As can be best seen in FIGS. 2 and 3, the movement of the slide member 52 transversely of the longitudinal axis 20 of the first shaft 18 is selectively limited in both directions by stop means 73 located at the opposite ends of the slide means 46. As shown, the slide stop means 73 includes first and second adjustable micrometers located at opposite ends of the slide means 46 with the spindle 74 of each micrometer stop 73 disposed to be selectively extended and retracted toward and away, respectively, from the ends of the slide receiving member 54. The sleeve 75 of each micrometer 73 is shown as being fixed to the top end of the sleeve bracket 58 at opposite ends of the slide receiving member 54. As the slide member 52 moves transversely of the longitudinal axis 20 of the first shaft 18 it will bring the spindle 74 of one or the other of the micrometers 73 in contact with the slide receiving member 54 which will stop further movement of the slide member 52. The amount of movement, as well as the starting point and stopping point, of the slide member 52 and, therefore, of the second shaft 42 radially of the first shaft 18, can be selectively adjusted by extending and retracting the spindles 74 of the micrometers 73.

The tool 12 to be manipulated or advanced by the apparatus 10 is attached to the bottom end or distal end 76 of the second shaft 42. The tool 12 is shown in FIGS. 1-3 as being attached to the second shaft 42 by means of an appropriate fixture 78. The tool 12 is illustrated as a cutting tool, for example a laser or as shown a water jet nozzle used for cutting a hole in a workpiece, or a disc from material stock located beneath the nozzle 12. The cutting nozzle 12 is attached to a source of high energy water by, for example, hoses. If the tool 12 were a laser, for example, the hoses would be a light transmission conduit.

In operation of the apparatus 10, to cut a circular hole in a workpiece, as the first shaft 18 is rotated clockwise about its longitudinal axis 20, the brake rotor 38 resists initially rotate about the first shaft 18 due to the frictional contact between the brake disc 26 and the brake rotor 38 because the brake rotor 38 is mounted on the first shaft 18 by means of the bushing 40. Relative motion between the brake rotor 38 and the slide member 52 is transmitted by the arm 70 which is received in the radial slot 72 of the brake rotor 38 due to the retarded rotational movement of the brake rotor 38 caused by the braking effect exerted thereon by the stationary brake disc 26. The contact between the distal end of the slide member moving arm 70 and the side walls of the radial slot 72 in the brake rotor 38 generates a force against the side of the arm 70 as it orbits with the first shaft 18 about the longitudinal axis 20 of the first shaft 18. Because the proximal end of the slide member moving arm 70 is attached to one lateral side of the slide member 52, the slide member 52 is caused to concurrently move transversely of the longitudinal axis 20 of the first shaft 18 as well as turn or orbit about the longitudinal axis 20 of the first shaft 18, thusly following a spiral path. As the slide member 52 moves transversely, the distal end of the slide member moving arm 70 moves outwardly of the brake rotor 38 in the radial slot 72. When the slide member 52 has moved transversely to the extent to cause the first one of the slide stop micrometers 73 to contact the slide receiving member 54 as shown in FIG. 3, further transverse movement of the slide member 52 is prevented so that the slide member 52 will now orbit at a fixed radius about the longitudinal axis 20 of the first shaft 18. When the slide stop micrometer 73 contacts the slide receiving member 54 the brake rotor 38 is forced to rotate by the arm 70 and slips relative to the brake disc 26 to limit the force exerted by the slide stop micrometer 73 against the slide receiving member 54 to prevent damaging the various components of the apparatus. At this point, the slide receiving member 54 continues to rotate with the first shaft 18 and the slide member 52 continues to rotate with the slide receiving member 54 thereby causing the second shaft 42 to move in an orbit about the axis of the first shaft 18. Thusly, the second shaft 42 being connected to the slide member 52 moves with the slide member 52 following its path of movement along a spiral path at an increasing radius outwardly away from the first shaft 18 and into an orbit about the longitudinal axis 20 of the first shaft 18 at a fixed distance radially of the first shaft 18. Likewise, the tool 12 being attached to the second shaft 42 also follows the spiral path, and into an orbit about the longitudinal axis 20 of the first shaft 18.

The second one of the slide stop micrometers 73 is used to set or determine the starting location relative to slide receiving member 54 and, therefore, the starting location or initial position of the tool 12, as shown in FIG. 2.

With reference to FIG. 4, there is shown the path followed by the slide member 52 and, therefore, also the second shaft 42 and tool 12 to cut a circular hole "D" in a workpiece 80. The second one of the micrometer slide stops 73 is set such that the tool 12 will be located at an initial point "A" (see FIG. 2) on the workpiece 80 inside the peripheral margin of the hole to be cut. The first shaft 18 is turned clockwise causing the slide member 52 to concurrently move transversely of the longitudinal axis 20 of the first shaft 18 as well as turn about the longitudinal axis 20 of the shaft 18 such that the slide member 52, second shaft 42 and the tool 12 follow an outwardly spiral path "B" from the initial point "A". When the first stop micrometer 73 contacts slide receiving member 54 (see FIG. 3) further sliding movement of the slide member 52 relative to the slide receiving member 54 and the first shaft 18 is stopped which determines the terminal point of "C" of transverse movement of the slide member 52, second shaft 42 and the tool 12. The terminal point "C" determines the radius of the circle "D" to be traced or cut from the workpiece 80 by the tool 12. As the first shaft 18 continues to rotate about its longitudinal axis 20, the slide member 52, second shaft 42 and tool 12 follow an orbit "D" about the longitudinal axis 20 of the first shaft 18 at this fixed radius.

Figure 5:
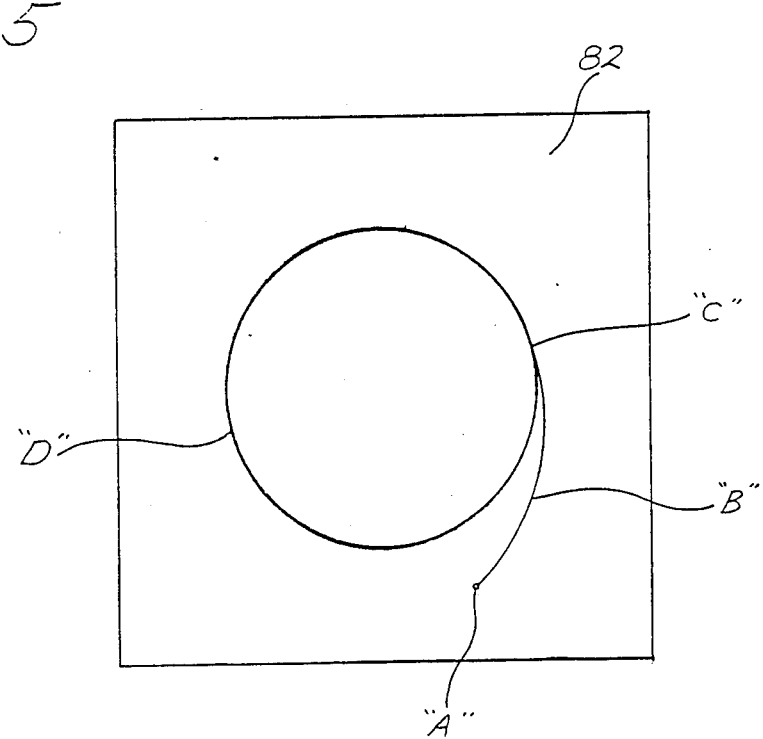

With reference to FIG. 5, there is shown the path followed by the slide member 52 and, therefore, also the second shaft 42 and tool 12 to cut a circular disc "D" from a material stock 82. The first one of the micrometer slide stops 73 is set such that the tool 12 will be located at an initial point "A" (see FIG. 3) on the material stock 82 outside the peripheral margin of the circular disc "D" to be cut. The first shaft 18 is turned counter-clockwise causing the slide member 52 to concurrently move transversely of the longitudinal axis 20 of the first shaft 18 as well as turn about the longitudinal axis 20 of the shaft 18 such that the slide member 52, second shaft 42 and the tool 12 follow an inwardly spiral path "B" from the initial point "A". When the second stop micrometer 73 contacts slide receiving member 54 (see FIG. 2) further movement of the slide member 52 relative to the slide receiving member 54 and the first shaft 18 is stopped which determines the terminal point "C" of transverse movement of the slide member 52, second shaft 42 and the tool 12. The terminal point "C" determines the radius of the disc "D" to be cut from the material stock 82 by the tool 12. As the first shaft 18 continues to rotate about its longitudinal axis 20, the slide member 52, second shaft 42 and tool 12 follow an orbit "D" about the longitudinal axis 20 of the first shaft 18 at this fixed radius.

In those applications wherein the tool 12 is a cutting tool using hoses or power lines, these hoses or lines are not twisted or kinked because the second shaft 42 does not rotate about its own longitudinal axis.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

I claim:

1. An apparatus for advancing a tool along a spiral path to an orbital path comprising:
    a stationary housing;
    a first shaft mounted for rotation about its longitudinal axis in the housing;
    a second shaft located in end-to-end relationship to the first shaft with the longitudinal axis of the second shaft parallel to the longitudinal axis of the first shaft;
    slide means interconnecting the adjacent proximal ends of the first and second shafts for allowing the second shaft to move transversely to the longitudinal axis of the first shaft and also move in an orbit about the longitudinal axis of the first shaft and;,
    slide moving means drivingly interconnecting the stationary housing to the slide means for causing the second shaft to move transversely when the first shaft rotates about its longitudinal axis relative to the stationary housing, the slide moving means comprising friction means for frictionally interconnecting the stationary housing to the slide means.

2. The apparatus of claim 1, further comprising stop means operatively associated with the slide means for limiting the distance the slide means moves the second shaft in the direction transverse to the longitudinal axis of the first shaft.

3. The apparatus of claim 1, wherein the slide means comprises:
    slide receiving means attached to the proximal end of the end of the first shaft for rotation therewith about the longitudinal axis of the first shaft; and,
    slide member means attached to the proximal end of the second shaft and interconnected to the slide receiving means for rotation with the slide receiving means and for movement relative to the slide receiving means in a direction generally radially of the longitudinal axis of the first shaft.

4. The apparatus of claim 3, further comprising slide member moving means driving interconnecting the stationary housing to the slide member means for causing the slide member moving means to move as the first shaft rotates about its longitudinal axis relative to the stationary housing.

5. The apparatus of claim 4, wherein the slide member moving means comprises friction means for frictionally interconnecting the stationary housing to the slide member means.

6. The apparatus of claim 3, further comprising bearing means interconnecting the slide member means to the second shaft for allowing the second shaft to move with the slide member means while remaining stationary about its own longitudinal axis.

7. The apparatus of claim 3, further comprising stop means operatively associated with the slide member means for limiting the distance the slide member means moves relative to the slide receiving means in the direction generally radially of the first shaft.

8. An apparatus for advancing a tool along a spiral path to an orbital path comprising:
    a stationary housing;
    a first shaft mounted for rotation about its longitudinal axis in the housing;
    a second shaft located in end-to-end relationship to the first shaft with the longitudinal axis of the second shaft parallel to the longitudinal axis of the first shaft;
    slide means interconnecting the adjacent proximal ends of the first and second shafts for allowing the second shaft to move transversely to the longitudinal axis of the first shaft and also move in an orbit about the longitudinal axis of the first shaft and;,
    bearing means interconnecting the slide means and second shaft for allowing the second shaft to move with the slide means while remaining stationary about its own longitudinal axis.

9. An apparatus for advancing a tool along a spiral path to an orbital path comprising:
    a stationary housing;
    a first shaft mounted for rotation about its longitudinal axis in the housing;
    a second shaft located in end-to-end relationship to the first shaft with the longitudinal axis of the second shaft parallel to the longitudinal axis of the first shaft;
    slide means interconnecting the adjacent proximal ends of the first and second shafts for allowing the second shaft to move transversely to the longitudinal axis of the first shaft and also move in an orbit about the longitudinal axis of the first shaft, the slide means comprising slide receiving means attached to the proximal end of the end of the first shaft for rotation therewith about the longitudinal axis of the first shaft and slide member means attached to the proximal end of the second shaft and interconnected to the slide receiving means for rotation with the slide receiving means and for movement relative to the slide receiving means in a direction generally radially of the longitudinal axis of the first shaft;
    slide member moving means driving interconnecting the stationary housing to the slide member means for causing the slide member moving means to move transversely of the longitudinal axis of the first shaft as the first shaft rotates about its longitudinal axis relative to the stationary housing, the slide member moving means comprises friction means for frictionally interconnecting the stationary housing to the slide member means, and the friction means comprises brake disc means connected to the stationary housing adjacent rotation; brake rotor means located adjacent to and in frictional contact with the brake disc means, and mounted for rotation relative to the first shaft; and, the slide member moving means interconnects the brake rotor means to the slide member means.

10. The apparatus of claim 9, further comprising bearing means interconnecting the slide member means to the second shaft for allowing the second shaft to move with the slide member means while remaining stationary about its own longitudinal axis.

11. The apparatus of claim 10, further comprising stop means operatively associated with the slide member means for limiting the distance the slide member means moves relative to the slide receiving means in the direction generally radially of the first shaft.

* * * * *